US006958902B2

(12) United States Patent
Tseng et al.

(10) Patent No.: US 6,958,902 B2
(45) Date of Patent: Oct. 25, 2005

(54) PIVOT-AND-POSITIONING ASSEMBLY FOR AN ELECTRONIC DEVICE

(75) Inventors: Hua-Chung Tseng, Taipei Hsien (TW); Chu-Hsian Chian, Taipei Hsien (TW)

(73) Assignee: Wistron Corporation, Taipei Hsien (TW)

( * ) Notice: Subject to any disclaimer, the term of this patent is extended or adjusted under 35 U.S.C. 154(b) by 247 days.

(21) Appl. No.: 10/632,593

(22) Filed: Aug. 1, 2003

(65) Prior Publication Data

US 2004/0075971 A1 Apr. 22, 2004

(30) Foreign Application Priority Data

Oct. 21, 2002 (TW) ........................................ 91216790 U (51) Int. Cl.⁷ ................................................. G06F 1/16
(52) U.S. Cl. ........................ 361/681; 361/683; 345/156; 248/176.3
(58) Field of Search ................................. 361/681, 683, 361/679, 682, 724–727; 345/168, 169, 156, 905; 248/917–923, 924, 176.3; 16/235, 366, 368, 342; 403/53, 57; 74/490.05, 490.06; 341/22; 400/489, 682, 691, 693; 312/208.1, 208.4

(56) References Cited

U.S. PATENT DOCUMENTS

| | | | | |
|---|---|---|---|---|
| 5,016,849 A | * | 5/1991 | Wu ........................... | 248/176.3 |
| 5,168,423 A | * | 12/1992 | Ohgami et al. ............. | 361/681 |
| 5,335,142 A | * | 8/1994 | Anderson ................... | 361/681 |
| 5,668,570 A | | 9/1997 | Ditzik ......................... | 345/173 |
| 5,873,554 A | * | 2/1999 | Nobuchi .................... | 248/278.1 |
| 6,105,919 A | * | 8/2000 | Min ............................ | 248/418 |
| 6,498,721 B1 | * | 12/2002 | Kim ............................ | 361/681 |
| 6,549,789 B1 | * | 4/2003 | Kfoury ..................... | 455/550.1 |
| 6,587,333 B2 | * | 7/2003 | Tseng et al. ................ | 361/681 |
| 6,798,646 B2 | * | 9/2004 | Hsu ........................... | 361/681 |
| 6,850,407 B2 | * | 2/2005 | Tanimoto et al. ........... | 361/681 |
| 6,876,545 B2 | * | 4/2005 | Tseng et al. ................ | 361/681 |
| 2003/0052857 A1 | * | 3/2003 | Pappas ....................... | 345/156 |
| 2003/0167600 A1 | * | 9/2003 | Chien et al. ................. | 16/367 |
| 2003/0193773 A1 | * | 10/2003 | Choi .......................... | 361/683 |
| 2004/0107540 A1 | * | 6/2004 | Hsu ............................ | 16/366 |

FOREIGN PATENT DOCUMENTS

| | | |
|---|---|---|
| CN | 2256972 Y | 6/1997 |
| CN | 2270840 Y | 12/1997 |
| CN | 2291357 Y | 9/1998 |
| CN | 1251927 A | 5/2000 |
| CN | 2435105 Y | 6/2001 |
| CN | 2487001 Y | 4/2002 |
| CN | 1371035 A | 9/2002 |

* cited by examiner

Primary Examiner—Michael Datskovskiy
(74) Attorney, Agent, or Firm—Ladas & Parry LLP (57) ABSTRACT

A pivot-and-positioning assembly for an electronic device includes a mounting seat, a rotatable member mounted rotatably on the mounting seat, a first engaging member mounted on the rotatable member and rotatable along a circumferential trajectory, and a pair of diametrically disposed second engaging members mounted on the mounting seat. Each second engaging member defines a retaining recess that opens at a tangential direction relative to the trajectory for receiving the first engaging member.

11 Claims, 9 Drawing Sheets

PIVOT-AND-POSITIONING ASSEMBLY FOR AN ELECTRONIC DEVICE

CROSS-REFERENCE TO RELATED APPLICATION

This application claims priority of Taiwan patent Application No. 091216790, filed on Oct. 21, 2002.

BACKGROUND OF THE INVENTION

1. Field of the Invention

This invention relates to a pivot-and-positioning assembly, more particularly to a pivot-and-positioning assembly for a portable electronic device, such as a portable computer.

2. Description of the Related Art

Figure 1:
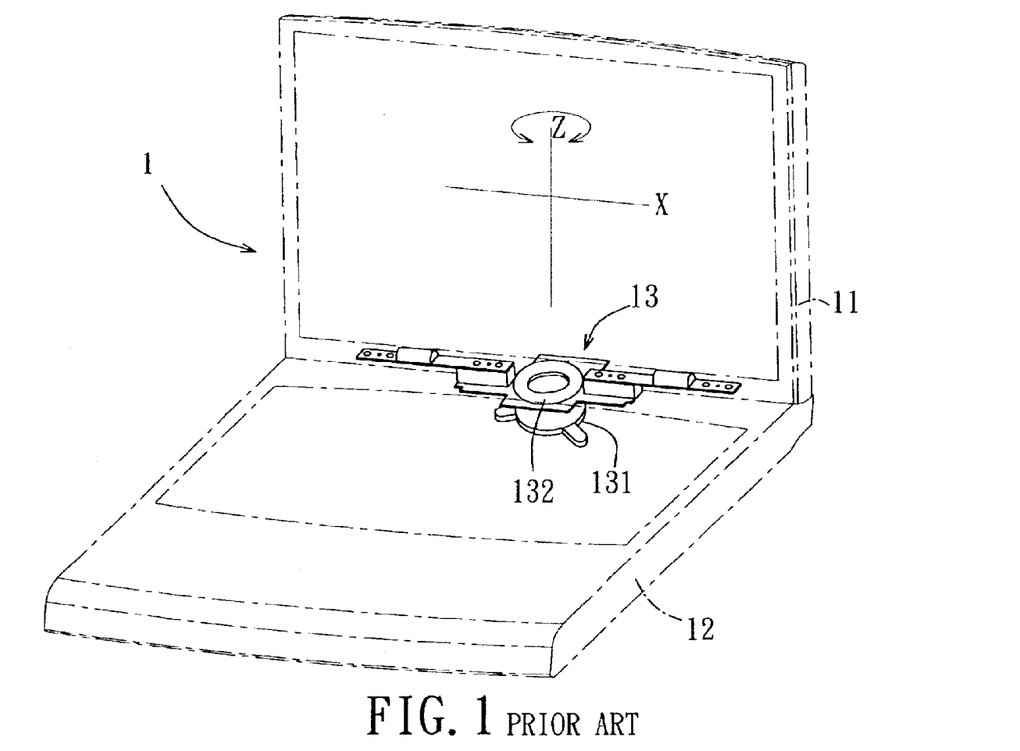
FIG. 1 is a perspective view of a conventional portable personal computer with a pivot-and-positioning assembly.
Figure 2:
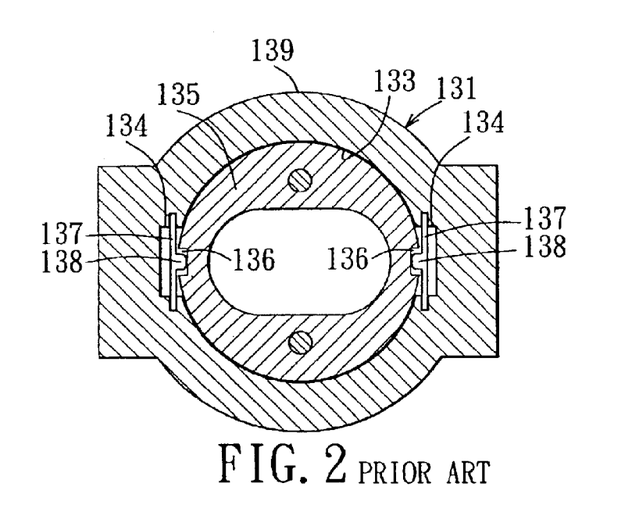
FIG. 2 is a sectional view of the pivot-and-positioning assembly of FIG. 1 with a positioning unit for positioning a display module of the portable personal computer.

FIGS. 1 and 2 illustrate a conventional pivot-and-positioning assembly 13 which connects a display module 11 and a main board module 12 for a portable computer 1. The pivot-and-positioning assembly 13 includes a mounting seat 131 secured to a rear end of the main board module 12, and a rotatable member 132 pivoted to a rear end of the display module 11 and mounted rotatably on the mounting seat 131 so as to permit rotation of the display module 11 relative to the main board module 12 about a first axis (X) and about a second axis (Z) between first and second positions. The mounting seat 131 includes a cylindrical member 139 with a cylindrical inner face 133 that is formed with a pair of diametrically disposed retaining grooves 134. The rotating member 132 includes a tubular element 135 that is rotatably received in the cylindrical member 139 and that is formed with a pair of diametrically disposed engaging grooves 136 which are aligned with and which confront the retaining grooves 134, respectively, when the display module 11 is positioned at the first or second position. A pair of elastic engaging plates 137 are respectively mounted in the retaining grooves 134, and are respectively formed with engaging tongues 138 that engage releasably and respectively the engaging grooves 136 so as to position the display module 11 at the respective one of the first and second positions.

Figure 3:
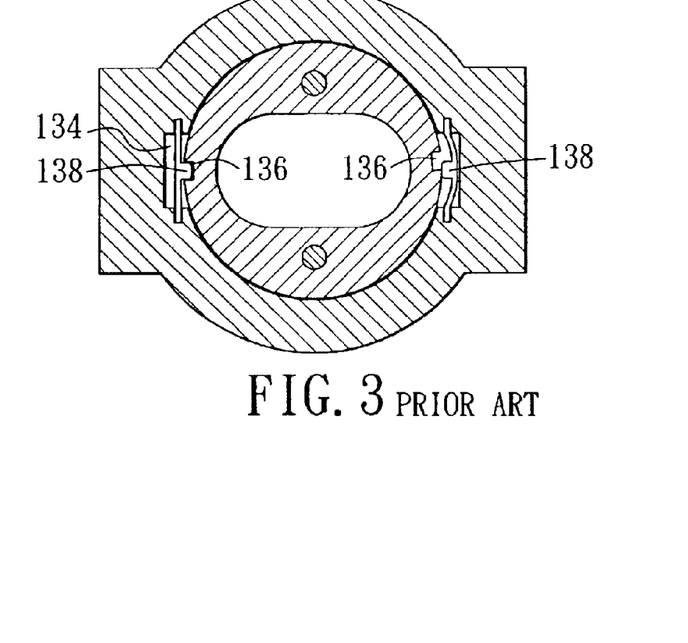
FIG. 3 is a sectional view illustrating how an engaging tongue can be easily misaligned with an engaging groove of the positioning unit of the pivot-and-positioning assembly of FIG. 1.
Figure 4:
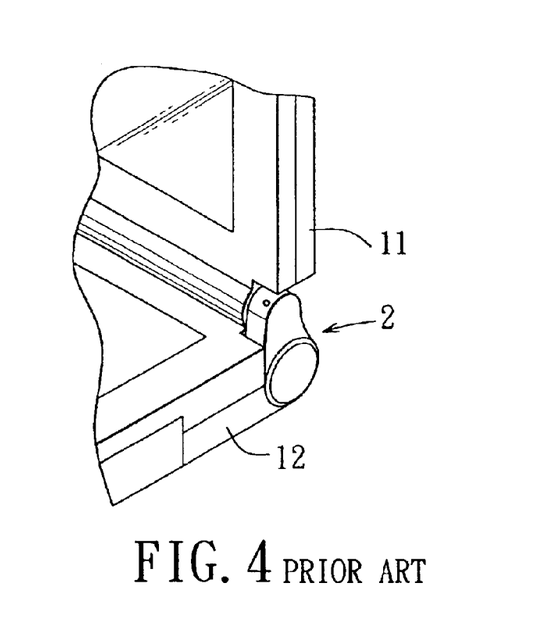
FIG. 4 is a fragmentary perspective view to illustrate an auxiliary positioning member of the pivot-and-positioning assembly of FIG. 1.
Figure 5:
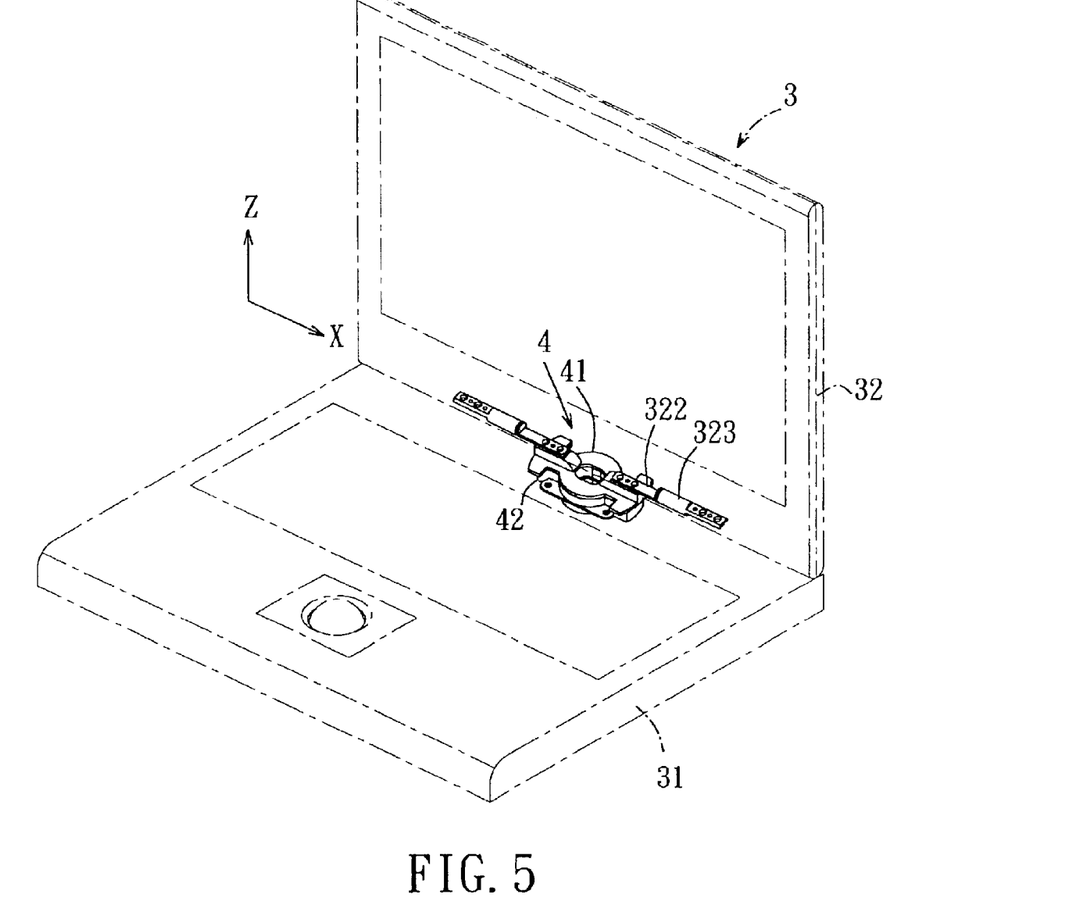
FIG. 5 is a perspective view of a portable computer with a pivot-and-positioning assembly embodying this invention.

The conventional pivot-and-positioning assembly is disadvantageous in that since the retaining grooves 134 and the engaging grooves 136 are formed in cylindrical faces, a relatively high precision is required for the formation of the same so as to permit radial alignment of the retaining grooves 134 with the engaging grooves 136 upon rotation of the display module 11 to the first and second positions. As such, a small deviation from the aforesaid radial alignment (see FIG. 3) or a larger clearance between the engaging ones of the engaging tongue 138 and the respective engaging groove 136 for accommodating the whole engaging tongue 138 in the engaging groove 136 can't make the position fixed. As a consequence, the conventional pivot-and-positioning assembly further includes an auxiliary positioning member 2 (see FIG. 4) to enhance positioning of the display module 11.

SUMMARY OF THE INVENTION

Therefore, it is an object of the present invention to provide a pivot-and-positioning assembly for an electronic device that is capable of overcoming the aforementioned drawbacks of the prior art.

According to this invention, there is provided a pivot-and-positioning assembly for an electronic device that includes first and second parts. The pivot-and-positioning assembly comprises: a pivot unit and a positioning unit. The pivot unit includes a mounting seat adapted to be secured to the second part, and a rotatable member mounted rotatably on the mounting seat and adapted to be secured to the first part so as to permit rotation of the first part about a first axis relative to the second part between first and second positions. The positioning unit includes a first engaging member that is secured to the rotatable member and that has an engaging portion which rotates about the first axis along a circumferential trajectory upon rotation of the first part relative to the second part, and a pair of second engaging members that are secured to the mounting seat and that are diametrically disposed on the circumferential trajectory. Each of the second engaging members defines a retaining recess that opens at a tangential direction relative to the circumferential trajectory in such a manner that the engaging portion of the first engaging member moves along the circumferential trajectory to be fittingly and releasably snapped into the retaining recess in one of the second engaging members so as to position the first part at the first position and that the engaging portion of the first engaging member moves along the circumferential trajectory to be fittingly and releasably snapped into the retaining recess in the other of the second engaging members so as to position the first part at the second position.

BRIEF DESCRIPTION OF THE DRAWINGS

In drawings which illustrate embodiments of the invention.

DETAILED DESCRIPTION OF THE EMBODIMENTS

For the sake of brevity, like elements are denoted by the same reference numerals throughout the disclosure.

Figure 9:
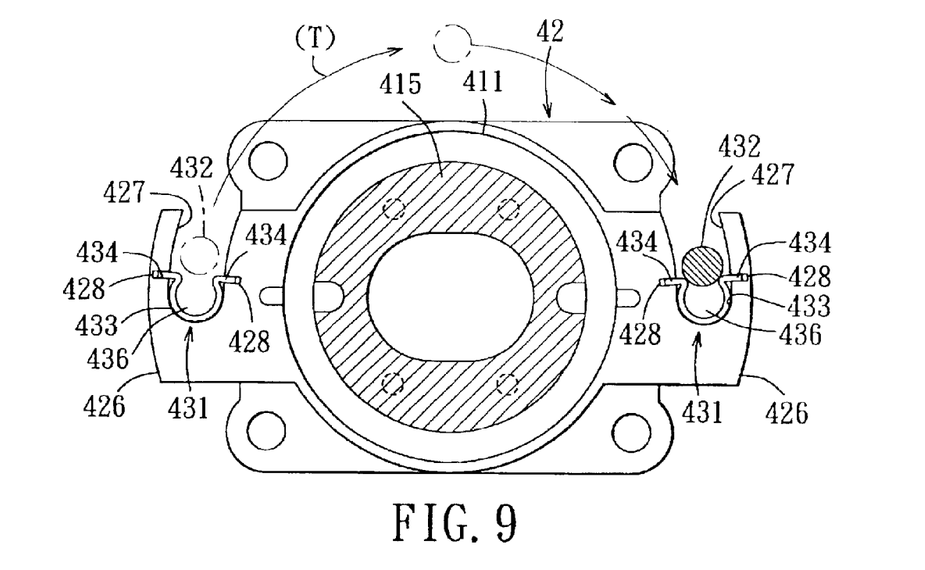
FIGS. 9 to 11 are sectional top views to illustrate the progress of how a first engaging member rotates to a position for snapping into a retaining recess in a clasp of the pivot-and-positioning assembly of FIG. 5.
Figure 10:
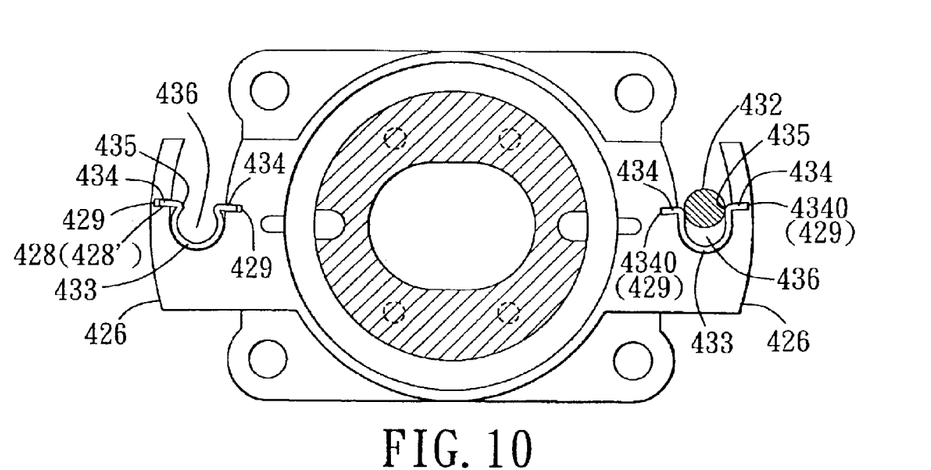
Figure 11:
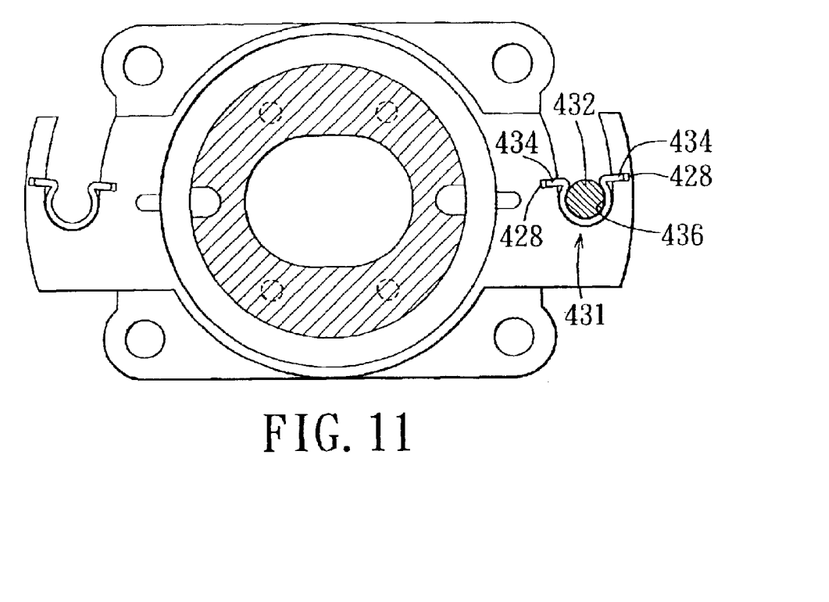
Figure 12:
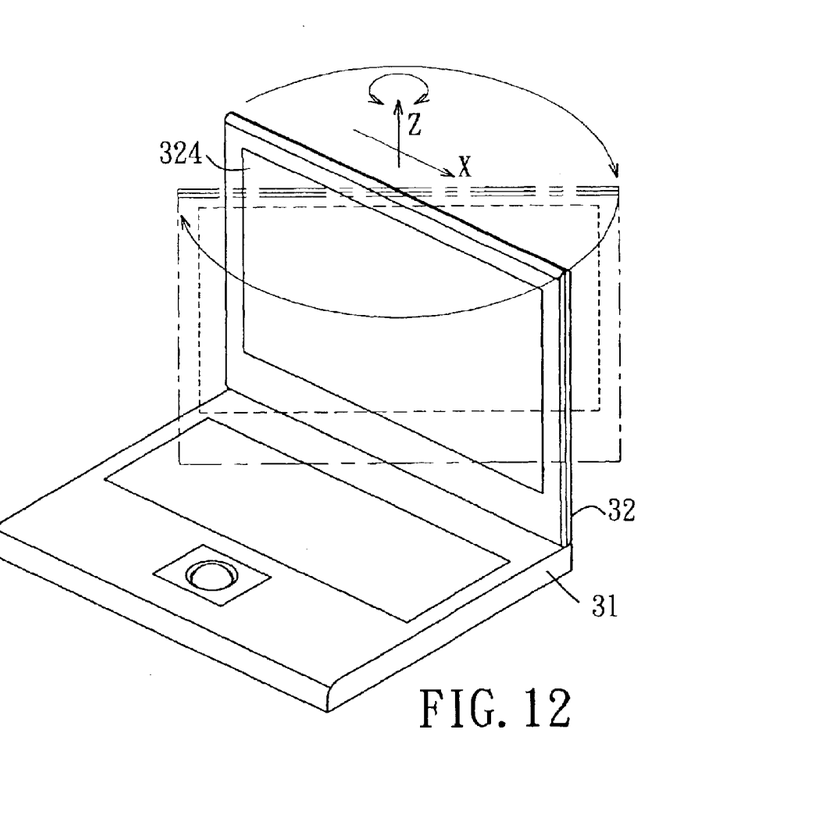
FIGS. 12 and 13 are schematic perspective views to illustrate how a display module rotates about a first axis from a first position to a second position and about a second axis from an upright position to a horizontal position.

FIGS. 5 to 9 illustrate a first embodiment of a pivot-and-positioning assembly 4 of this invention for an electronic device 3, such as a portable computer. The electronic device 3 includes a first part 32 (i.e., a display module of the portable computer), and a second part 31 (i.e., a main board module of the portable computer). The pivot-and-positioning assembly 4 includes: a pivot unit (41, 42) and a positioning unit 43. The pivot unit (41, 42) includes a mounting seat 42 adapted to be secured to the second part 31, and a rotatable member 41 mounted rotatably on the mounting seat 42 and adapted to be secured to the first part 32 so as to permit rotation of the first part 32 about a first axis (Z) relative to the second part 31 between first and second positions (see FIGS. 12 and 13). The positioning unit 43 includes a first engaging member 432 that is secured to the rotatable member 41 and that has an engaging portion 4320 which rotates about the first axis (Z) along a circumferential trajectory (T) (see FIG. 9) upon rotation of the first part 32 relative to the second part 31, and a pair of second engaging members 431 that are secured to the mounting seat 42 and that are diametrically disposed on the circumferential trajectory (T). Each of the second engaging members 431 defines a retaining recess 436 that opens at a tangential direction relative to the circumferential trajectory (T) in such a manner that the engaging portion 4320 of the first engaging member 432 moves along the circumferential trajectory (T) to be fittingly and releasably snapped into the retaining recess 436 in one of the second engaging members 431 so as to position the first part 32 at the first position and that the engaging portion 4320 of the first engaging member 432 moves along the circumferential trajectory (T) to be fittingly and releasably snapped into the retaining recess 436 in the other of the second engaging members 431 so as to position the first part 32 at the second position. FIGS. 9 to 11 illustrate the progress of movement of the engaging portion 4320 of the first engaging member 432 along the circumferential trajectory (T) from one of the second engaging members 431 to the other of the second engaging members 431.

Figure 6:
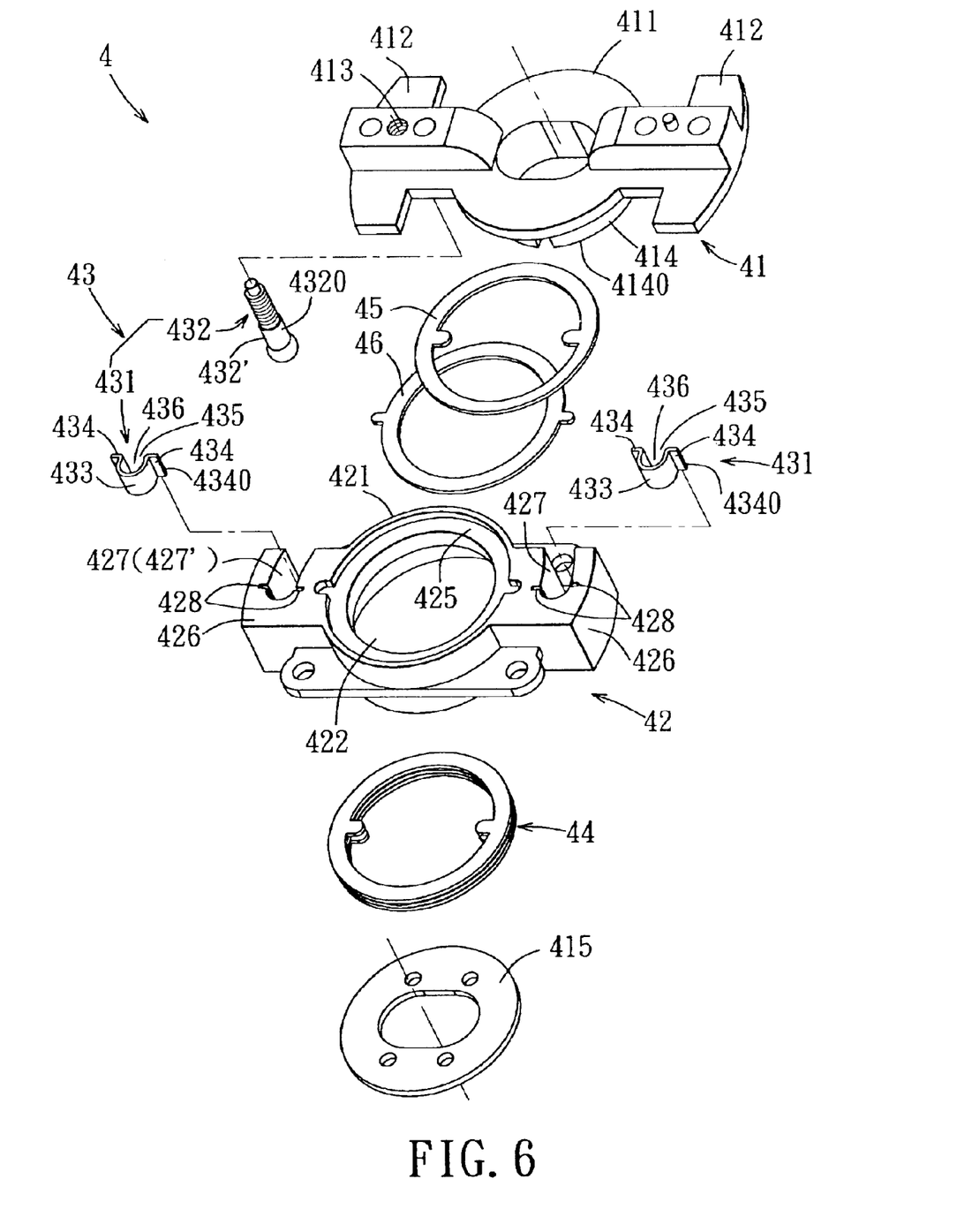
FIG. 6 is an exploded perspective view of the pivot-and-positioning assembly of FIG. 5.
Figure 7:
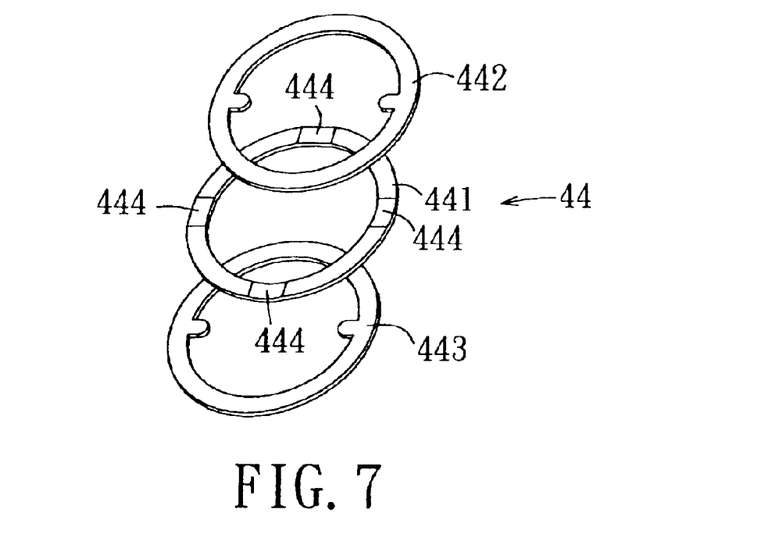
FIG. 7 is an exploded perspective view of a pad unit shown in FIG. 6.
Figure 8:
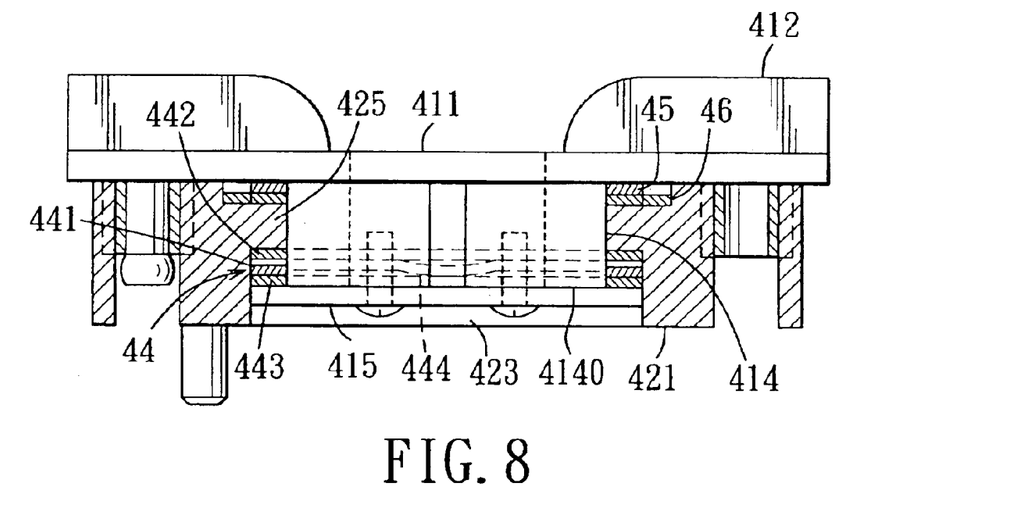
FIG. 8 is a sectional side view of the pivot-and-positioning assembly of FIG. 5.

Each of the second engaging members 431 includes an elastic C-shaped clasp 433 secured to the mounting seat 42 and defining the retaining recess 436. The first engaging member 432 includes a bolt 432' that is secured to the rotatable member 41 and that has a shank portion defining the engaging portion 4320.

The mounting seat 42 includes a cylindrical member 421 and a pair of first wings 426 projecting outwardly and radially from the cylindrical member 421. Each of the first wings 426 is formed with an arcuate slot 427 that is defined by a slot-defining wall 427', and a pair of opposing retaining grooves 428 that are formed in the slot-defining wall 427'. The slot 427 in each of the first wings 426 opens at the aforesaid tangential direction. The clasp 433 of each of the second engaging members 421 has two opposite ends 434, and is retained in the arcuate slot 427 in the slot-defining wall 427' of a respective one of the first wings 426 by inserting the ends 434 of the clasp 433 into the retaining grooves 428.

The cylindrical member 421 of the mounting seat 42 confines an inner space 422, and is formed with an annular first flange 425 projecting radially and inwardly therefrom into the inner space 422. The rotatable member 41 includes a tubular element 414 received rotatably in the inner space 422, an annular second flange 411 projecting outwardly and radially from the tubular element 414 and confronting the first flange 425, and a pair of second wings 412 projecting outwardly and radially from the second flange 411 and aligned respectively with the first wings 426. The bolt 432' engages threadedly a threaded hole 413 in one of the second wings 412. A first resistance-providing pad unit (45, 46) is sandwiched between the first and second flanges 425, 411 so as to provide resistance to rotation of the first part 32 about the first axis (Z).

The second flange 411 is disposed at one side of the first flange 425. The tubular element 414 has a bottom end 4140 that is disposed at an opposite side of the first flange 425 that is opposite to the second flange 411. The pivot-and-positioning assembly 4 further includes an annular third flange 415 received in the inner space 422, secured to the bottom end 4140 of the tubular element 414, and confronting the first flange 425, and a second resistance-providing pad unit 44 sandwiched between the first and third flanges 425, 415 so as to provide resistance to rotation of the first part 32 about the first axis (Z). The second resistance-providing pad unit 44 includes elastic first and second pads 442, 443, and an elastic third pad 444 that is sandwiched between the first and second pads 442, 443 and that is formed with a plurality of bumps 444 projecting therefrom and abutting against the second pad 443 (see FIG. 8).

Figure 13:
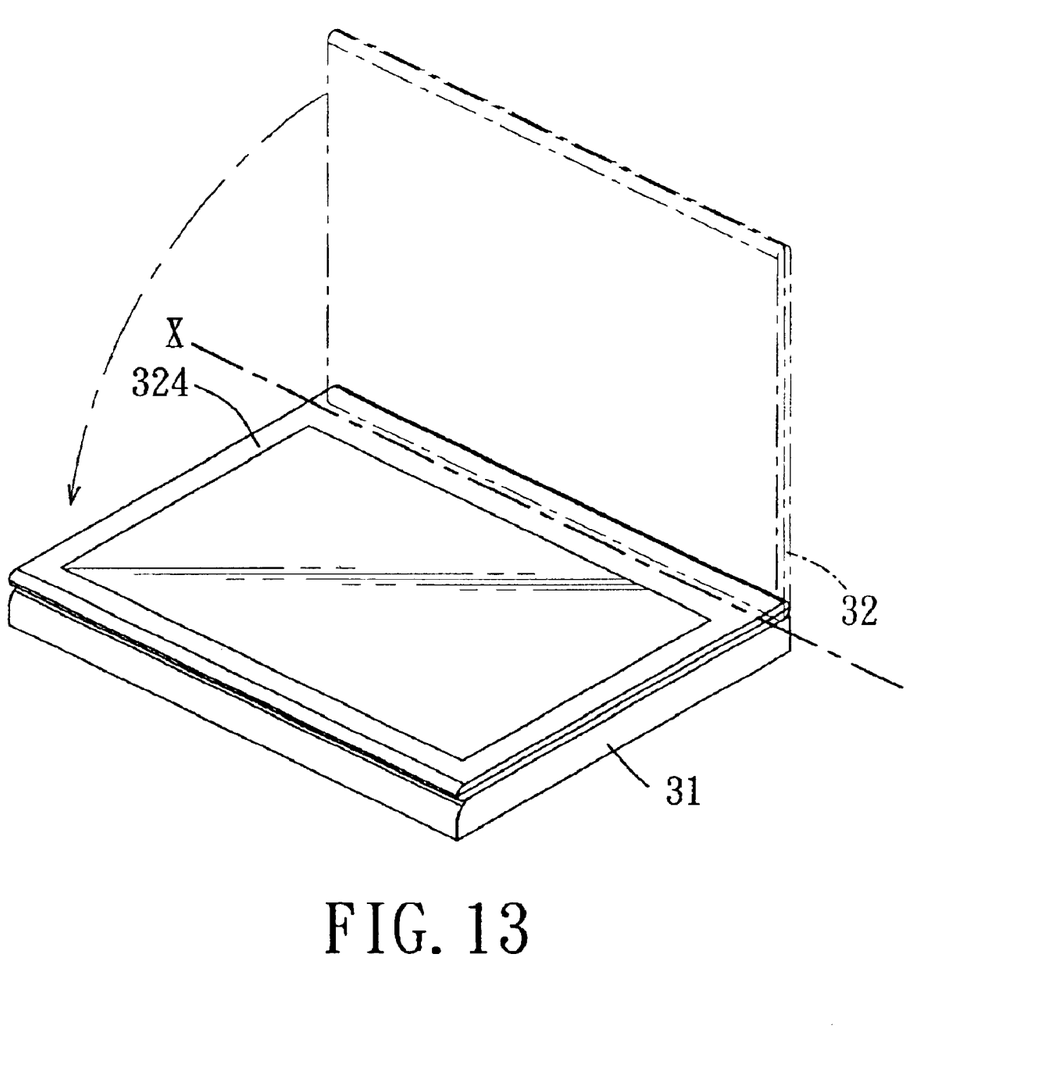

The rotatable member 41 further includes a pair of opposing tubular parts 323 (see FIG. 5) that are adapted to be secured to the first part 32, and a pair of pivot pins 322 that are respectively secured to the second wings 412 and that extend respectively into the tubular parts 323 so as to permit further rotation of the first part 32 relative to the second part 31 about the pivot pins 322 that cooperatively define a second axis (X) which is perpendicular to the first axis (Z). FIG. 13 illustrates how the first part 32 can rotate about the second axis (X) relative to the second part 31 from an upright position to a horizontal position which permits the portable computer to operate as a tablet computer.

Referring now to FIG. 10, in combination with FIG. 6, the clasp 433 of each second engaging member 431 defines a constricted opening 435 of the respective retaining recess 436 which elastically expands in diameter during passing of the engaging portion 4320 of the first engaging member 432 therethrough. Each of the retaining grooves 428 in the slot-defining wall 427' of the slot 427 in each of the first wings 426 is defined by a groove-defining wall 428' which has a closed end 429 disposed inwardly of the slot-defining wall 427. The ends 434 of the clasp 433 have opposite end faces 4340 that are respectively disposed adjacent to the closed ends 429 of the groove-defining walls 428' of the retaining grooves 428 and that are spaced apart from each other by a distance which is less than the distance measured from one of the closed ends 429 to the other of the closed ends 429 of the groove-defining walls 428' so that when the engaging portion 4320 of the first engaging member 432 passes through the constricted opening 435, the lengths of the retaining grooves 428 are sufficient to accommodate the displacement of the ends 434 of the clasp 433 due to the expansion of the constricted opening 435.

Figure 14:
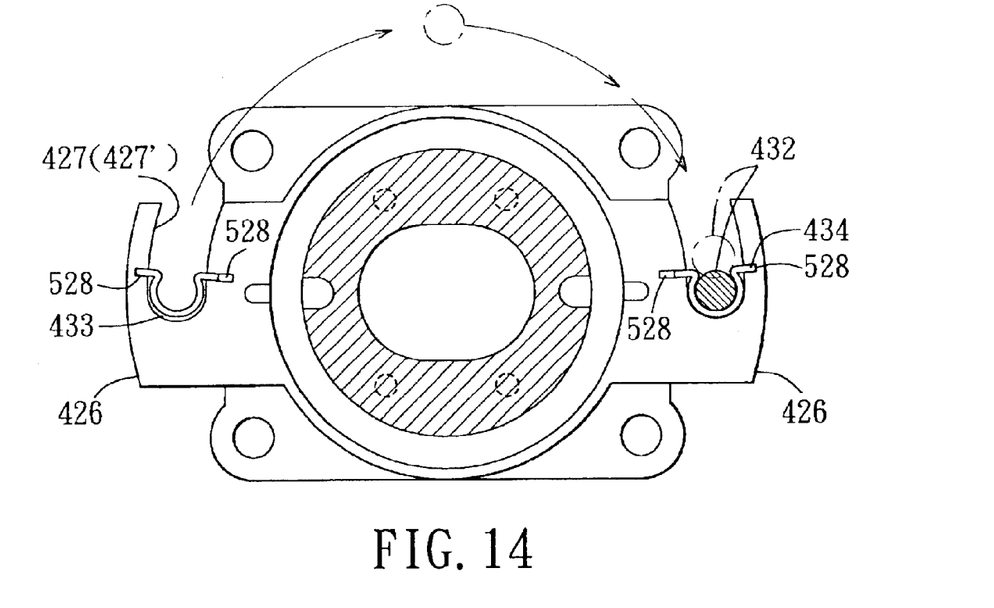
FIG. 14 is a sectional top view of a second embodiment modified from the previous embodiment of the pivot-and-positioning assembly of FIG. 5.

FIG. 14 illustrates a second embodiment of the pivot-and-positioning assembly 4 of this invention, with the retaining grooves 528 modified from the retaining grooves 428 of the previous embodiment shown in FIGS. 9 to 11. Each pair of the retaining grooves 528 in the slot-defining wall 427' of the slot 427 in each first wing 426 differ in length as compared to the lengths of the pair of the retaining grooves 428 of the previous embodiment.

Figure 15:
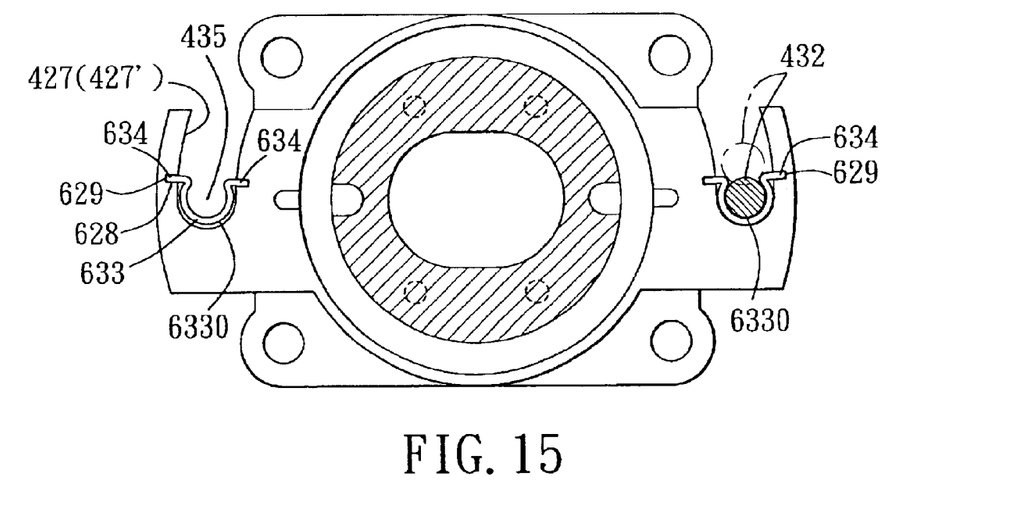
FIG. 15 is a sectional top view of a third embodiment modified from the previous embodiment of the pivot-and-positioning assembly of FIG. 5.

FIG. 15 illustrates a third embodiment of the pivot-and-positioning assembly 4 of this invention, with the clasps 633 and the retaining grooves 628 modified from the clasp 433 and the retaining grooves 428 of the previous embodiment shown in FIGS. 9 to 11. The ends 634 of the clasps 633 extend to the closed ends 629 of the retaining grooves 628. Each of the clasps 633 has a middle section 6330 extending between the ends 634 and expandable toward the slot-defining wall 427' during passing of the engaging portion 4320 of the first engaging member 432 through the constricted opening 435.

Since the retaining recess 436 of each second engaging member 431 is disposed on the circumferential trajectory (T), and opens at the tangential direction relative to the circumferential trajectory (T), formation of the slot 427 in each first wing 426 along a segment of the circumferential trajectory (T) requires less precision as compared to that of the aforesaid retaining grooves (which open at the radial direction) of the conventional pivot-and-positioning assembly. Moreover, tight engagement between the first and second engaging members 432, 431 can be achieved without resulting in misalignment between the first and second engaging members 432, 431 as commonly encountered in the prior art.

With the invention thus explained, it is apparent that various modifications and variations can be made without departing from the spirit of the present invention.

We claim:

1. A pivot-and-positioning assembly for an electronic device that includes first and second parts, said pivot-and-positioning assembly comprising:
   a pivot unit including
      a mounting seat adapted to be secured to the second part, and
      a rotatable member mounted rotatably on said mounting seat and adapted to be secured to the first part so as to permit rotation of the first part about a first axis relative to the second part between first and second positions; and
   a positioning unit including
      a first engaging member that is secured to said rotatable member and that has an engaging portion which rotates about said first axis along a circumferential trajectory upon rotation of the first part relative to the second part, and
      a pair of second engaging members that are secured to said mounting seat and that are diametrically disposed on said circumferential trajectory, each of said second engaging members defining a retaining recess that opens at a tangential direction relative to said circumferential trajectory in such a manner that said engaging portion of said first engaging member moves along said circumferential trajectory to be fittingly and releasably snapped into said retaining recess in one of said second engaging members so as to position the first part at the first position and that said engaging portion of said first engaging member moves along said circumferential trajectory to be fittingly and releasably snapped into said retaining recess in the other of said second engaging members so as to position the first part at the second position.

2. The pivot-and-positioning assembly of claim 1, wherein each of said second engaging members includes an elastic C-shaped clasp secured to said mounting seat and defining said retaining recess, said first engaging member including a bolt that is secured to said rotatable member and that has a shank portion defining said engaging portion.

3. The pivot-and-positioning assembly of claim 2, wherein said mounting seat includes a cylindrical member and a pair of first wings projecting outwardly and radially from said cylindrical member, each of said first wings being formed with an arcuate slot that is defined by a slot-defining wall, and a pair of opposing retaining grooves that are formed in said slot-defining wall, said slot in each of said first wings opening at said tangential direction, said clasp of each of said second engaging members having two opposite ends and being retained in said arcuate slot in said slot-defining wall of a respective one of said first wings by insertng said ends of said clasp into said retaining grooves.

4. The pivot-and-positioning assembly of claim 3, wherein said cylindrical member of said mounting seat confines an inner space and is formed with an annular first flange projecting radially and inwardly therefrom into said inner space, said rotatable member including a tubular element received rotatably in said inner space, an annular second flange projecting outwardly and radially from said tubular element and confronting said first flange, and a pair of second wings projecting outwardly and radially from said second flange and aligned respectively with said first wings, said bolt engaging threadedly one of said second wings, said pivot-and-positioning assembly further comprising a first resistance-providing pad unit sandwiched between said first and second flanges.

5. The pivot-and-positioning assembly of claim 4, wherein said second flange is disposed at one side of said first flange, said tubular element having a bottom end that is disposed at an opposite side of said first flange that is opposite to said second flange, said pivot-and-positioning assembly further comprising an annular third flange received in said inner space, secured to said bottom end of said tubular element, and confronting said first flange, and a second resistance-providing pad unit sandwiched between said first and third flanges.

6. The pivot-and-positioning assembly of claim 5, wherein said rotatable member further includes a pair of opposing tubular parts that are adapted to be secured to the first part, and a pair of pivot pins that are respectively secured to said second wings and that extend respectively into said tubular parts so as to permit further rotation of the first part relative to the second part about said pivot pins that cooperatively define a second axis which is perpendicular to the first axis.

7. The pivot-and-positioning assembly of claim 5, wherein said second resistance-providing pad unit includes elastic first and second pads, and an elastic third pad that is sandwiched between said first and second pads and that is formed with a plurality of bumps projecting therefrom and abutting against one of said first and second pads.

8. The pivot-and-positioning assembly of claim 3, wherein each of said retaining grooves in said slot-defining wall of said slot in each of said first wings is defined by a groove-defining wall which has a closed end disposed inwardly of said slot-defining wall, said ends of said clasp having opposite end faces that are respectively disposed adjacent to said closed ends of said groove-defining walls of said retaining grooves and that are spaced apart from each other by a distance which is less than the distance measured from one of said closed ends to the other of said closed ends of said groove-defining walls.

9. A portable computer comprising:
   a display module;
   a main board module; and
   a pivot-and-positioning assembly including
      a pivot unit including
         a mounting seat secured to said main board module, and
         a rotatable member mounted rotatably on said mounting seat and secured to said display module so as to permit rotation of said display module about a first axis relative to said main board module between first and second positions, and a positioning unit including a first engaging member that is secured to said rotatable member and that has an engaging portion which rotates about said first axis along a circumferential trajectory upon rotation of said display module relative to said main board module, and a pair of second engaging members that are secured to said mounting seat and that are diametrically disposed on said circumferential trajectory, each of said second engaging members defining a retaining recess that opens at a tangential direction relative to said circumferential trajectory in such a manner that said engaging portion of said first engaging member moves along said circumferential trajectory to be fittingly and releasably snapped into said retaining recess in one of said second engaging members so as to position said display module at the first position and that said engaging portion of said first engaging member moves along said circumferential trajectory to be fittingly and releasably snapped into said retaining recess in the other of said second engaging members so as to position said display module at the second position.

10. The portable computer of claim 9, wherein each of said second engaging members includes an elastic C-shaped clasp secured to said mounting seat and defining said retaining recess, said first engaging member including a bolt that is secured to said rotatable member and that has a shank portion defining said engaging portion.

11. A pivot-and-positioning assembly for an electronic device that includes first and second parts, said pivot-and-positioning assembly comprising:

a pivot unit including a mounting seat adapted to be secured to the second part, and a rotatable member mounted rotatably on said mounting seat and adapted to be secured to the first part so as to permit rotation of the first part about a first axis relative to the second part between first and second positions; and a positioning unit including a first engaging member that is secured to said rotatable member and that rotates about said first axis along a circumferential trajectory upon rotation of the first part relative to the second part, and a pair of second engaging members that are secured to said mounting seat and that are diametrically disposed on said circumferential trajectory so as to permit engagement between said first engaging member and one of said second engaging members when the first part rotates to the first position and engagement between said first engaging member and the other of said second engaging members when the first part rotates to the second position.

* * * * *